US009042412B2

(12) United States Patent
Su et al.

(10) Patent No.: US 9,042,412 B2
(45) Date of Patent: May 26, 2015

(54) METHOD AND APPARATUS FOR DETECTING COMMUNICATION CHANNEL DELAY ASYMMETRY

(75) Inventors: Bin Su, Beijing (CN); Youyi Li, Beijing (CN); Torbjorn Einarsson, Vastmanland (SE)

(73) Assignee: ABB Technology Ltd., Zurich (CH)

( * ) Notice: Subject to any disclaimer, the term of this patent is extended or adjusted under 35 U.S.C. 154(b) by 471 days.

(21) Appl. No.: 13/390,962

(22) PCT Filed: Dec. 31, 2009

(86) PCT No.: PCT/CN2009/076347
§ 371 (c)(1),
(2), (4) Date: Feb. 17, 2012

(87) PCT Pub. No.: WO2011/079460
PCT Pub. Date: Jul. 7, 2011

(65) Prior Publication Data
US 2012/0147941 A1  Jun. 14, 2012

(51) Int. Cl.
*H04J 3/06* (2006.01)
*H02H 1/00* (2006.01)
*H02H 3/30* (2006.01)

(52) U.S. Cl.
CPC ............. *H04J 3/0682* (2013.01); *H04J 3/0658* (2013.01); *H02H 1/0061* (2013.01); *H02H 3/30* (2013.01); *H04J 3/065* (2013.01)

(58) Field of Classification Search
CPC ..... H04J 3/0635; H04J 3/0638; H04J 3/0661; H04J 3/0664; H04J 3/0667; H04J 3/067; H04J 3/0682; H04J 3/0685; H04J 3/0688; H04J 3/0691; H04J 3/0694; H04J 3/0697; H04J 3/0658; H04L 43/106; H04L 43/0852; H04L 43/0853; H04L 43/0864; H04L 43/087; H04L 43/0858

USPC .......... 370/216–228, 241–253, 650, 503–520
See application file for complete search history.

(56) References Cited

U.S. PATENT DOCUMENTS 6,625,176 B1 * 9/2003 Amann et al. ................ 370/503
7,058,008 B1 * 6/2006 Wilson et al. ................ 370/216
(Continued)

FOREIGN PATENT DOCUMENTS

CN       1997027 A    7/2007
CN     101098219 A    1/2008

OTHER PUBLICATIONS

ISA/CN International Search Report re PCT Application No. PCT/CN2009/076347, Dated Oct. 21, 2010.

*Primary Examiner* — Ricky Ngo
*Assistant Examiner* — Wei-Po Kao
(74) *Attorney, Agent, or Firm* — Robert A. Jefferis; Driggs, Hogg, Daugherty & Del Zoppo Co., LPA (57) ABSTRACT

The invention provides a method and apparatus for detecting communication channel delay asymmetry between transmission line protection devices. The method comprises: calculating, repeatedly, clock disparity between clocks of the protection devices and communication delays at different paths of the communication channel; comparing the latest calculated clock disparity and communication delays with previously calculated clock disparities and communication delays, respectively; determining a channel switching has happened if a change of the calculated clock disparity exceeds a first threshold, or a change of the calculated communication delays for any path exceeds a second threshold; and determining the channel delays as asymmetrical if a difference between the calculated communication delays of the different paths after the channel switching exceeds a third threshold.

12 Claims, 3 Drawing Sheets

(56) References Cited

U.S. PATENT DOCUMENTS

| | | | |
|---|---|---|---|
| 2007/0030810 A1* | 2/2007 | Rayner | 370/238 |
| 2007/0147562 A1* | 6/2007 | Eidson | 375/354 |
| 2009/0238211 A1 | 9/2009 | DeCusatis et al. | |
| 2010/0085989 A1* | 4/2010 | Belhadj et al. | 370/503 |

* cited by examiner

METHOD AND APPARATUS FOR DETECTING COMMUNICATION CHANNEL DELAY ASYMMETRY

RELATED APPLICATION

This application is a national filing of PCT application Serial No. PCT/CN2009/076347, filed Dec. 31, 2009.

TECHNICAL FIELD

The invention relates to the communication in a transmission line protection system. In particular, the invention relates to a method and apparatus for detecting communication channel delay asymmetry and ensure accurate synchronization of line differential IEDs (Intelligent Electrical Devices).

BACKGROUND ART

Numerical line current differential protection has been established as one of the most popular transmission line protection scheme. This is mainly because of its simple and clear nature. The differential line protection has natural phase segregated operation capability; immunes to power swing; weak in-feed; and is applicable to multi-terminals solution, etc. The developments of communication technology have even promoted more popular applications of line differential protection.

In a numerical line differential protection, the signals of sampled current are obtained from protection devices (e.g., IEDs) located geographically apart from each other. The current signals sampled from different IEDs (normally locate at different line ends) have to be synchronized (also referred to as time coordinated) before comparing with each other in order to avoid introducing errors.

The synchronization of sampled signals from different IEDs (also referred to as the synchronization of different IEDs in this invention) has to be very accurate, or otherwise the synchronization error might cause serious incorrect operation of line current differential protection. An inaccuracy of 0.1 ms in a 50 Hz AC system brings a maximum amplitude error of operation current around 3%, whilst an inaccuracy of 1 ms brings a maximum amplitude error of around 31%. The corresponding errors for a 60 Hz system are respectively around 4% and 38%. (See, *ABB Technical reference manual line difference protection IED RED670*, and Phil Beaumont, Gareth Baber, et al. *Line Current Differential Relays Operating over SDH/SONET Networks*. PAC, summer 2008).

Figure 1A:
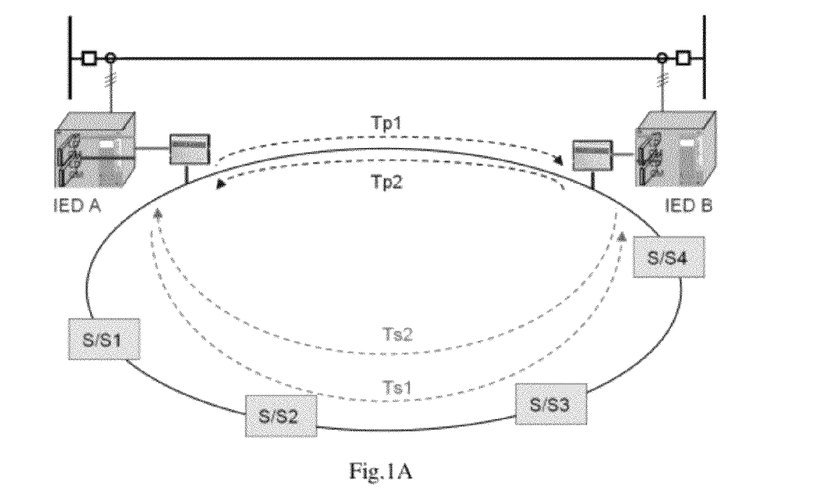
FIGS. 1A and 1B shows a schematic view of communication channels and echo process between two IEDs.
Figure 1B:
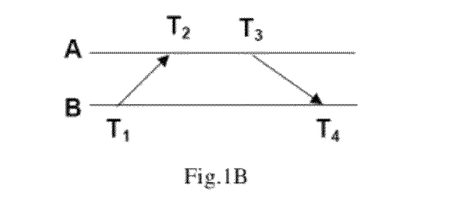

Presently, most of line differential relays adopt the so called "Echo method" (also referred to as "Ping-Pong method") to ensure the synchronization. The theory of echo method is briefly introduced by one echo process below:

As shown in FIGS. 1, A and B indicates two protection devices, such as IED. And the IEDs communicate with each other by sending and receiving messages. The IED B sends a message to IED A at IED B's internal time T1. IED A receives the message at its internal clock time T2. Similarly, IED A sends a message to IED B at IED A's internal time T3, and IED B receives the message at its internal time T4. Therefore, time instances T2 and T3 are taken with reference to the internal clock of IED A, and the time instances T1 and T4 are taken with reference to the internal clock of IED B. The communication time consumed between the IEDs is thereby measured.

The time instances T2 and T3 are transferred from IED A to IED B (or vice versa). It is assumed that the sending and receiving delays between the IEDs are equal to each other (also referred to as symmetrical channel delay). IED B then calculates the communication delay time $T_d$ (from IED A to IED B or from IED B to IED A) and the clock disparity $\Delta t$ between the reference clocks of IED A and IED B.

The clock disparity $\Delta t$ and communication delay are then used for synchronizing the sampled signals through interpolating the sampled signals from the remote end before the current differential algorithm is executed, or executing sampling timing control to achieve that the sampling instants of both IEDs are synchronized. The synchronization can be implemented by many conventional approaches, such as the method disclosed in Houlei Gao, Shifang Jiang, et al. *Sampling Synchronization methods in digital current differential protection. Automation of electric power systems*, Vol 20, September 1996. The calculated clock disparity $\Delta t$ and communication delay must be very accurate to ensure the accuracy of synchronization.

However, the assumption of symmetrical channel delay in the traditional echo method above is not always valid. This is particularly true with the popular applications of SDH/SONET (Synchronous Digital Hierarchy/Synchronous Optical Network). The SDH/SONET is able to survive failures of the network by reconfiguring and maintaining services through the use of self-healing ring architectures. The self-healing or self-switching structures in a communication ring can be either "unidirectional" or "bi-directional". In a unidirectional switching, only the faulted path is switched to the opposite direction whilst the non-faulted path keeps its original route. In a bi-directional switching, when there is a fault occurred in the ring, both the sending and receiving routes are switched to follow the same opposite direction along the ring. The difference is that the bi-directional switching will maintain an equal signal communication delays for the same switched sending and receiving paths, whilst unidirectional switching may introduce permanently asymmetrical communication delays through different sending and receiving routes. However, it has to be noted that the bi-directional switching does not introduce permanently asymmetrical communication delays, but the introduced transient asymmetrical delays could be 50 ms or even longer.

When the channel delays are asymmetrical (i.e. sending and receiving delays are different) and such an asymmetry is not detected by the IEDs, the traditional echo method, which is based on the assumption of symmetrical communication delay, is no longer valid, and the differential IEDs are under high risk of incorrect operation. Therefore, a reliable method to ensure the synchronization no matter the channel delays are symmetrical or not is of high importance and desirable.

Several approaches have been proposed to solve the problem of asymmetrical communication delay. A GPS (or other external clocks such as Compass/BeiDou Navigation Satellite System, Galileo, etc) based method was proposed. As an example of such external clock based methods, a GPS receiver module is embedded in each IED for synchronizing its local clock with the external clock. However, in practice, the GPS signals are not always perfectly or precisely received by the IEDs. The GPS antenna has to be installed with care. Otherwise the reception of GPS signal may be interrupted. Mal-operation (e.g. field engineers unintentionally disconnect the cable or antenna) or unfavorable environment (e.g. antenna close to coast is corroded by water, military GPS jamming) also result an unreliable signal receiving. In the situations described above, the IED will probably lose the capability of tolerating communication delay asymmetry.

As shown in above paragraphs, the existing methods are not reliable under many situations. Therefore, it is highly desirable to propose a method which can reliably detect channel delay asymmetry and ensure accurate synchronization no matter the channel delays are symmetrical or asymmetrical.

BRIEF SUMMARY OF THE INVENTION

The invention proposes a method to detect the communication delay asymmetry and ensure accurate synchronization of line differential IEDs.

According to one preferred embodiment of the invention, it provides a method for detecting communication channel delay asymmetry between transmission line protection devices. The method comprises: calculating, repeatedly, a clock disparity between clocks of the protection devices and communication delays at different paths of the communication channel; comparing the latest calculated clock disparity and communication delays with previously calculated clock disparities and communication delays, respectively; determining a channel switching has happened if a change of the calculated clock disparity exceeds a first threshold, or a change of the calculated communication delays for any path exceeds a second threshold; and determining the channel delays as asymmetrical if a difference between the calculated communication delays of the different paths after the channel switching exceeds a third threshold.

According to another preferred embodiment of the invention, wherein, the clock disparity and communication delays are calculated based on a difference between the communication delays of data sending and receiving paths; and synchronizing signals sampled by protection devices based on the calculated clock disparities and communication delays.

According to another preferred embodiment of the invention, wherein, the method further comprises: calculating the communication delays of sending and receiving path after the channel switching, based on the clock disparities calculated before the channel is switched; and calculating the difference between the communication delays of sending and receiving path after the channel switching.

According to another preferred embodiment of the invention, the method further comprises: comparing the calculated communication delays after the channel switching with the calculated communication delays before the channel switching; identifying a communication path which is un-switched if the change of the calculated communication delays of the path is less than a fourth threshold; adjusting the clock disparities by the communication delay of the un-switched communication channel, and adjusting the communication delays of the data sending and receiving path by the adjusted clock disparities.

According to another preferred embodiment of the invention, the method further comprises: calculating a mean value of the calculated clock disparities, a mean value of the calculated communication delays of data sending path, a mean value of the calculated communication delays of data receiving path; comparing the latest calculated clock disparity with the mean value of calculated clock disparities; and comparing the latest calculated communication delays with the mean values of calculated communication delays.

According to another preferred embodiment of the invention, the method further comprises: calculating a mean value of the calculated communication delays of sending path, a mean value of calculated communication delays of receiving path; calculating the difference between the mean values of the communication delays of sending path and receiving path.

According to another preferred embodiment of the invention, the method further comprises: calculating a mean value of the calculated communication delays before the channel switching; calculating a mean value of the calculated communication delays after the channel switching; comparing the calculated mean value after the channel switching with the calculated mean value before the channel switching.

According to another preferred embodiment of the invention, wherein: the first and fourth thresholds depend on the accuracy of oscillators of the protection devices, length of communication interruption period caused by the channel switching, and the jitter characteristic of communication channels; and the second and third thresholds depend on the jitter characteristic of the communication channel.

According to another preferred embodiment of the invention, it provides a method for detecting communication channel delay asymmetry between transmission line protection devices. The method comprises: sending and receiving data through a first channel and a second channel; calculating a first delay for sending and receiving data through the first channel and second channel sequentially; calculating a second delay for sending and receiving data through the second channel and first channel sequentially; and determining the communication channels as asymmetrical if the difference between the first delay and second delay exceeds a fifth threshold.

According to another preferred embodiment of the invention, wherein, it further comprises: calculating, at least twice, a third delay for sending and receiving data through the first channel; calculating, at least twice, a fourth delay for sending and receiving data through the second channel; obtaining a difference between the at least two third delays and a difference between the at least two fourth delays; and determining the first channel as switched channel if the difference between third delays is more than a sixth threshold, and determining the second channel as switched channel if the difference between fourth delays is more than the sixth threshold; and calculating the communication delays of sending and receiving paths of the switched channel.

According to another preferred embodiment of the invention, wherein, the fifth and sixth thresholds depend on the jitter characteristic of the communication channels.

According to another preferred embodiment of the invention, it provides an apparatus for detecting communication channel delay asymmetry between transmission line protection devices. The apparatus comprises: a calculating unit, which is configured to repeatedly calculate a clock disparity between clocks of the protection devices and communication delays at different paths of the communication channel, a comparing unit, which is configured to compare the latest calculated clock disparity and communication delays with previously calculated clock disparities and communication delays, respectively; a first determining unit, which is configured to determine a channel switching has happened if a change of the calculated clock disparity exceeds a first threshold, or a change of the calculated communication delays for any path exceeds a second threshold; and a second determining unit, which is configured to determine the channel delays as asymmetrical if a difference between the calculated communication delays of the different paths after the channel switching exceeds a third threshold.

According to another preferred embodiment of the invention, it provides an apparatus for detecting communication channel delay asymmetry between transmission line protection devices. The apparatus comprises: a sending and receiving unit, which is configured to send and receive data through a first channel and a second channel; a first calculating unit, which is configured to calculate a first delay for sending and receiving data through the first channel and second channel sequentially; a second calculating unit, which is configured to calculate a second delay for sending and receiving data through the second channel and first channel sequentially; and a determining unit, which is configured to determine the communication channels as asymmetrical if the difference between the first delay and second delay exceeds a fifth threshold.

According to another preferred embodiment of the invention, it provides a computer program for synchronizing communication channels between transmission line protection devices, which computer program is loadable into an internal memory of a digital computer and comprises computer program code means to make, when said program is loaded in said internal memory, the computer execute the steps according to any one of above methods.

PREFERRED EMBODIMENTS OF THE INVENTION

Embodiment One

As shown in FIG. 1A, there are two IEDs, i.e. IED A and IED B for protecting a transmission line. And the IEDs communicate with each other via two sets of communication channel, i.e. primary channel (P) and secondary channel (S). Each channel has 2 paths, i.e. sending path and receiving path. For IED A, the sending delay via primary channel (P) is referred to as $T_{p1}$, and the sending delay via secondary channel (S) is referred to as $T_{s1}$. The receiving delay via primary channel (P) is referred to as $T_{p2}$, and the receiving delay via secondary channel (S) is referred to as $T_{s2}$.

Both primary channel and secondary channel are symmetrical, however, because of the jitter characteristics of communication channel including many communication devices (for example, multiplexer, digital switch, etc), the sending delays and receiving delays of the same channel may have slight variation with each other and from time to time (also referred as to jitter). It should be noted that such jitters are acceptable as they will not cause incorrect operation of line differential protections. A set of explanatory communication delays is shown as in Table. 1 below.

At any time, each IED can send message to the other IED via one path (either in primary channel or secondary channel), and receiving message from the other IED via one path (either in primary channel or secondary channel). If the sending and receiving paths are both in primary channel or both in secondary channel, the communication delays are symmetrical, or in other words, such conditions are refereed to as channel delay symmetry. However, under unfavorable conditions, the sending path is in primary channel while the receiving path is in secondary channel, or the sending path is in secondary channel while the receiving path is in primary channel, then communication delays are asymmetrical, or in other words, such conditions are refereed to as channel delay asymmetry.

TABLE 1

| communication delays of communication channels | | | | | | | | |
|---|---|---|---|---|---|---|---|---|
| $T_{p2}$ (ms) | 1.618 | 1.626 | 1.619 | 1.637 | 1.526 | 1.613 | 1.579 | 1.554 |
| $T_{p1}$ (ms) | 1.636 | 1.587 | 1.613 | 1.548 | 1.601 | 1.598 | 1.635 | 1.617 |
| $T_{s2}$ (ms) | 13.139 | 13.212 | 13.198 | 13.203 | 13.282 | 13.197 | 13.168 | 13.196 |
| $T_{s1}$ (ms) | 13.153 | 13.098 | 13.147 | 13.163 | 13.204 | 13.173 | 13.104 | 13.177 |

As shown in Table. 1, the communication delays for each channel are not stable. The values of delays vary from each other at different sampling cycles (e.g. around 0.1 ms) when messages are sent and received through the same route (i.e., all through primary channel or all through secondary channel). Consequently, the calculated clock disparity $\Delta t$ between internal clocks of different IEDs may vary from time to time.

As shown in FIG. 1B, the calculated one way communication delay, $T_{dcal}$, can be obtained by equation (1) as below, and the calculated clock disparity between IEDs A and B, $\Delta t_{cal}$, can be obtained by the equation (2):

$$T_{dcal} = ((T2-T1)+(T4-T3))/2 \qquad (1)$$

$$\Delta t_{cal} = ((T2+T3)-(T1+T4))/2 \qquad (2)$$

Table. 2 shows the time instance $T_1$ to $T_4$ measured at each IED and the calculated $T_{dcal}$ and $\Delta t_{cal}$. $T_{d1}$ and $T_{d2}$ are the sending and receiving delays for IED B. It can be seen that IED B sends a message to IED A to initiate each echo process at every 5 ms. The clock of IED A is ahead of IED B by about 18.3 ms, i.e. the actual clock disparity $\Delta t_{act} = 18.3$ ms.

TABLE 2

| Calculation of $T_d$ and $\Delta t$ | | | | | | | | |
|---|---|---|---|---|---|---|---|---|
| $T_{d1}$ (ms) | 1.618 | 1.626 | 1.619 | 1.637 | 1.526 | 1.613 | 1.579 | 1.554 |
| $T_{d2}$ (ms) | 1.636 | 1.587 | 1.613 | 1.548 | 1.601 | 1.598 | 1.635 | 1.617 |
| $T_1$ (ms) | 0 | 5 | 10 | 15 | 20 | 25 | 30 | 35 |
| $T_2$ (ms) | 19.918 | 24.926 | 29.919 | 34.937 | 39.826 | 44.913 | 49.879 | 54.854 |
| $T_3$ (ms) | 20.038 | 25.046 | 30.039 | 35.057 | 39.946 | 45.033 | 49.999 | 54.974 |
| $T_4$ (ms) | 3.374 | 8.333 | 13.352 | 18.305 | 23.247 | 28.331 | 33.334 | 38.291 |
| $T_{dcal}$ (ms) | 1.627 | 1.6065 | 1.616 | 1.5925 | 1.5635 | 1.6055 | 1.607 | 1.5855 |
| $\Delta t_{cal}$ (ms) | 18.291 | 18.32 | 18.303 | 18.345 | 18.263 | 18.308 | 18.272 | 18.269 |

As shown in Table 2, the calculated communication delay $T_{dcal}$ and clock disparity $\Delta t_{cal}$ vary at each echo process because $T_{d1}$ and $T_{d2}$ are not stable. However, the mean value of the calculated Δt over a given period $T_{mean}$ (e.g. 5 power frequency cycle, 20 echo processes, etc.,) is theoretically approximate to the actual $Δt_{act}$.

For example, the mean value of $Δt_{cal}$ in Table. 2 is: $Δt_{mean}$=18.296 ms, which is very close to 18.3 ms. In the mean value calculation, it is assumed that actual Δt is stable. Actually the actual Δt is changing because of frequency difference between internal oscillators of different IEDs, and during normal operation, the actual Δt changes smoothly instead of suddenly in a given period. For example, if both IEDs' oscillators are of 50 ppm accuracy, the biggest frequency difference is 100 ppm, which means a maximum 0.1 ms clock disparity for every 1 second period. If both oscillators are of 1 ppm accuracy, the max clock disparity will be 0.1 ms in a period over 50 seconds. As a result, if $T_{mean}$=100 ms, the error of $Δt_{mean}$ is less than 5 μs with a 50 ppm accuracy oscillator, and the error of $Δt_{mean}$ is less than 0.1 μs with a 1 ppm accuracy oscillator. Conclusively, the mean value of the calculated Δt over a given period $T_{mean}$ is theoretically approximate to the actual $Δt_{act}$.

Similarly, the theoretical communication delay $T_{dmean}$ may be obtained based on the calculation of mean value of $T_{dcal}$. The mean value of all $T_{dcal}$ in Table. 2 is $T_{dmean}$=1.600 ms.

According to equation (1), the calculation of $T_d$ is not affected by the clock disparity Δt, therefore, the longer $T_{mean}$ is, the higher accuracy of $T_{dmean}$ will be. To make the calculation simpler, the same $T_{mean}$ is used for the calculation of both $T_{dmean}$ and $Δt_{mean}$.

It has to be noted that the period for calculating each value is not necessary a constant one. For example, the IED may perform the calculation at different frequencies with respect to different operating stages.

Above introduction is focused only on the condition that the communication channel delays are symmetrical, which is the base of traditional echo method. However, when the channel delays are asymmetrical, the echo process (a first IED sends a message to a second IED, and the said second IED sends back a message to the said first IED) can still be performed, and the echo calculation (calculating the communication delays $T_{d1}$ and $T_{d2}$ and the clock disparity Δt) can be calculated with the equations below, taking the difference between the communication delays into consideration:

$$T_{d1}=((T2-T1)+(T4-T3))/2+T_{diff}/2 \quad (3)$$

$$T_{d2}=((T2-T1)+(T4-T3))/2-T_{diff}/2 \quad (4)$$

$$Δt_{cal}=((T2+T1)-(T1+T4))/2-T_{diff}/2 \quad (5)$$

Where the $T_{diff}$ is the difference between the communication delays:

$$T_{diff}=T_{d1}-T_{d2} \quad (6)$$

$T_{diff}$ can be given by operator, or calculated by IED during operation. It should be noted that when the channel delays are symmetrical, $T_{diff}$=0, equations (3), (4) and (5) are the same with equations (1) and (2).

Normally before both IEDs start up, the field engineers of IEDs are required to ensure the channel delay symmetry. So, normally for the first echo process after both IEDs start up, $T_{diff}$=0. If the channel delay symmetry is not ensured for the first echo process after both IEDs start up, $T_{diff}$ can be given by operator, or calculated by IED, for example, based on the external clock.

As long as $T_{diff}$ is accurate, the communication delays $T_{d1}$ and $T_{d2}$ and the clock disparity Δt are accurate, no matter the channel delays are symmetrical or asymmetrical. The clock disparity Δt and communication delay are then used for synchronizing the sampled signals through interpolating the sampled signals from the remote end before the current differential algorithm is executed, or executing sampling timing control to achieve that the sampling instants of both IEDs are synchronized.

In this invention, the equations (3), (4) and (5) are used for echo calculation under both symmetrical channel delay and asymmetrical channel delay conditions. With the results of echo calculation, the IEDs can maintain synchronization, no matter the channel delays are symmetrical or asymmetrical.

When there is no channel switching, the calculated communication delay and clock disparity have small jitter at each echo process, and their mean values are even more stable. After the channel switching (normally after a short period of communication interruption, e.g. 100 ms), the calculated communication delay and clock disparity will have big difference compared with the results prior to the switching. Thus the IED can detect the communication channel switching by comparing the calculated clock disparity Δt, communication delays $T_{d1}$ and $T_{d2}$ with their prior values or preferably the mean values of their prior values. If a sudden change bigger than given threshold is observed in any one of above values, it is assumed that a channel switching was detected.

The threshold for detecting sudden change in clock disparity can be calculated and set by IED, based on the sum of the max possible change in actual clock disparity during the period of communication interruption, and the max possible jitter in calculated clock disparity caused by the communication delays' slight jitter when there is no channel switching. The max possible change in actual clock disparity during the period of communication interruption can be calculated by IED according to the accuracy of IEDs' oscillators and the length of the communication interruption period. For example, if both IEDs' oscillators are of 50 ppm accuracy, and the length of communication interruption is 100 ms, then the max possible change in actual clock disparity is 0.01 ms during communication interruption. The max possible jitter in calculated clock disparity caused by the communication delays' slight jitter when there is no channel switching can be set by IED operator according to the jitter characteristic of the communication channel. For example, according to the communication delays given in Table. 2, the max possible jitter in calculated clock disparity caused by the communication delay jitter is 0.06 ms. Considering a reasonable margin, the max possible jitter in calculated clock disparity caused by the communication delay jitter can be set as 0.1 ms. Thus the threshold for detecting sudden change in clock disparity can be calculated and set by IED as 0.11 ms.

The thresholds for detecting sudden change in communication delays can be set by IED operators, based on the max possible jitter in communication delays when there is no channel switching, which is according to the jitter characteristic of the communication channel. From the viewpoint of simplicity, the thresholds for detecting sudden change in communication delays of both sending path and receiving path can be set as the same value. For example, according to the communication delays given in Table. 2, the max possible jitter in communication delays is 0.11 ms. Considering a reasonable margin, the threshold for detecting sudden change in communication delays can be set by IED operators as 0.15 ms.

After the channel switching is detected, the IED needs to calculate the new communication delays. As the actual Δt is caused by the frequency difference between internal oscillators of different IEDs, and changes slowly, the IED can calculate the communication delays by using the clock disparity Δt or preferably its mean value stored in memory before channel switching according to equations (7) and (8) below, where $\Delta t_m$ represents the stored clock disparity before channel switching or preferably its mean value before channel switching.

$$T_{d1}=T_2-T_1-\Delta t_m \quad (7)$$

$$T_{d2}=T_4-T_3+\Delta t_m \quad (8)$$

Then the IED can calculate the new $T_{diff}$ with equation (6). To achieve better accuracy, it is preferable to calculate the mean value of the new $T_{diff}$ over a given period after the channel switching.

Once the new $T_{diff}$ (or preferably its mean value) is calculated, the IED can use it to perform echo process and echo calculation with equations (3), (4) and (5), and synchronize the sampled signals with the calculated communication delays and clock disparities, until the next channel switching is detected.

If the calculated $T_{diff}$ (or preferably its mean value) is bigger than a given threshold $T_{diff*thre}$, the IED issues an alarm signal to indicate the channel delay asymmetry.

The threshold $T_{diff*thre}$ can be set by IED operators, based on the max possible difference between the communication delays of sending and receiving paths for a symmetrical channel, which is according to the jitter characteristic of the communication channel. For example, according to the communication delays given in Table. 1, the max possible difference between the communication delays for a symmetrical channel is 0.18 ms. Considering a reasonable margin, the threshold for detecting sudden change in communication delays can be set by IED operators as 0.25 ms. If the mean value of calculated $T_{diff}$ is used, then the threshold $T_{diff*thre}$ can be set by IED operators based on the max possible difference between the mean values of communication delays of sending and receiving paths for a symmetrical channel, which is according to the jitter characteristic of the communication system. For example, according to the communication delays given in Table. 1, the max possible difference between the mean values of communication delays for a symmetrical channel is 0.05 ms. Considering a reasonable margin, the threshold $T_{diff*thre}$ can be set by IED operators as 0.1 ms.

Since the channel switching normally introduces a communication interrupt, e.g., 100 ms, the stored clock disparity $\Delta t_m$ before channel switching may be inaccurate after the switching, thus the calculated communication delays by equations (7) and (8) will have errors. To further improve the accuracy, the actual Δt after the channel switching can be calculated by IED. To do so, the IED can find out which path (i.e., sending path or receiving path) maintains un-switched (i.e. still use its original route), then use the stored communication delay (or its mean value) of the un-switched route to calculate the actual clock disparity Δt after the switching.

The IED finds out which path maintains un-switched by calculating the differences between post-switching communication delays with their pre-switching delays, according to (9) and (10) below:

$$T_{d1diff}=|T_{d1}-T_{d1*m}| \quad (9)$$

$$T_{d2diff}=|T_{d2}-T_{d2*m}| \quad (10)$$

If $T_{d1diff}$ is smaller than a given threshold $T_{d1*thre}$, the IED decides that the $T_{d1}$ path maintains un-switched, and calculate the actual clock disparity Δt after the switching based on equation (11) below. If $T_{d2diff}$ is smaller than a given threshold $T_{d2*thre}$, the IED decides that the $T_{d2}$ path maintains un-switched, and calculate the actual clock disparity Δt after the switching based on equation (12) below.

$$\Delta t=\Delta t_m+(T_{d1}-T_{d1*m}) \quad (11)$$

$$\Delta t=\Delta t_m-(T_{d2}-T_{d2*m}) \quad (12)$$

It should be noted that in equations (9), (10), (11) and (12), $T_{d1}$ and $T_{d2}$ are the calculated post-switching communication delays, or preferably their mean values over a given period after the channel switching. $T_{d1*m}$ and $T_{d2*m}$ are the calculated pre-switching communication delays, or preferably their mean values over a given period before the channel switching.

The thresholds $T_{d1*thre}$ and $T_{d2*thre}$ can be calculated and set by IED, based on the sum of the max possible change in actual clock disparity during the period of communication interruption, and the max possible jitter in the communication delays when the path is not switched. From the viewpoint of simplicity, these two thresholds can be set as the same value. The max possible change in actual clock disparity during the period of communication interruption can be calculated by IED according to the accuracy of IEDs' oscillators and the length of the communication interruption period. For example, if both IEDs' oscillators are of 50 ppm accuracy, and the length of communication interruption is 100 ms, then the max possible change in actual clock disparity is 0.01 ms during communication interruption. The max possible jitter in the communication delays when the path is not switched can be set by IED operator according to the jitter characteristic of the communication system. For example, according to the communication delays given in Table. 1, the max possible jitter in the communication delays when the path is not switched is 0.14 ms. Considering a reasonable margin, the max possible jitter in calculated clock disparity caused by the communication delay jitter can be set as 0.2 ms. Thus the thresholds $T_{d1*thre}$ and $T_{d2*thre}$ can be calculated and set by IED as 0.21 ms. If the mean values are used in equations (9), (10), as the max possible jitter in the mean values of communication delays when the path is not switched is theoretically around 0, the thresholds $T_{d1*thre}$ and $T_{d2*thre}$ can be set considering only the max possible change in actual clock disparity during the period of communication interruption. In the above example, considering a reasonable margin, the thresholds can be set as 0.1 ms.

Then the IED re-calculates the communication delays $T_{d1}$ and $T_{d2}$ according to equations (7) and (8), with the adjusted Δt replacing $\Delta t_m$. Then the IED can calculate the new $T_{diff}$ with equation (6). Once the new $T_{diff}$ (or preferably its mean value) is calculated, the IED can perform echo process and echo calculation with equations (3), (4) and (5), until the next channel switching is detected.

With above mentioned method, the IEDs can precisely calculate the communication delays and the clock disparity, so that they can maintain synchronization, no matter the channel delays are symmetrical or asymmetrical. When asymmetry was introduced into the communication channels, the IED can detect the asymmetry and issues an alarm signal to indicate the channel delay asymmetry. In comparison, with respect to the traditional echo method, the communication delays and clock disparity are either un-available or un-reliable when the channel becomes asymmetrical.

Embodiment Two

In another embodiment, at any time, each IED can send message to the other IED via two paths, and receiving message from the other IED via two paths. There are at least two possible configurations:

In the first configuration, the protected line has one set of differential protection (one IED at each terminal), the IEDs communicate with each other via two channels, i.e. a primary channel and a secondary redundant channel. At any time, each IED can send message to the other IED via two paths (one path in primary channel, and another path in secondary channel), and receiving message from the other IED via two paths (one path in primary channel, and another path in secondary channel).

In the second configuration, the protected line has two sets of differential protections (dual-main protection devices, i.e. primary protection set and secondary protection set), and each set of protection devices has its own communication channel respectively. Another similar situation is that a set of parallel lines are protected by two sets of differential protections, wherein, each protection set protects one line and has its own communication channel respectively. At any time, each IED can send message to the other IED in the same protection set via two paths (one path in the communication channel of the protection set itself, and another path via the communication channel of the other protection set), and receiving message from the other IED via two paths (one path in the communication channel of the protection set itself, and another path via the communication channel of the other protection set).

Configuration 1: The Protected Line has One Set of Differential Protection with Two Communication Channels.

Figure 2:
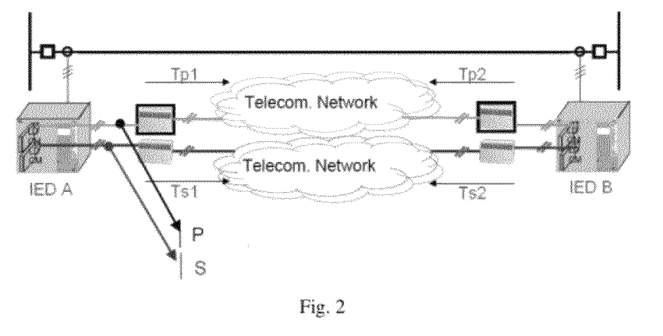
FIG. 2 shows a schematic view of line protection system with two IEDs.
Figure 3:
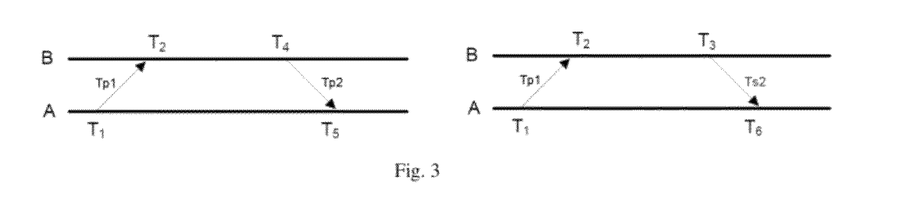
FIG. 3 shows a schematic view of echo process between two IEDs.

As shown in FIG. 2, there are two IEDs, i.e. IED A and IED B for protecting the line. The IEDs communicate with each other via two communication channels, i.e. primary channel and secondary channel. For IED A, the sending delay via primary channel is referred to as $T_{p1}$, and the sending delay via secondary channel is referred to as $T_{s1}$. the receiving delay via primary channel is referred to as $T_{p2}$, and the receiving delay via secondary channel is referred to as $T_{s2}$. In an ideal operation condition, both channels have symmetrical delays, i.e. $T_{p1}$ equals to $T_{p2}$ and $T_{s1}$ equals to $T_{s2}$. The following proposed solution can detect the condition when channel delays becomes asymmetrical, as described below:

Step 1: IED A sends a message to IED B via primary channel. Then IED B sends echo information back to IED A via both primary channel and secondary channel, as shown in FIG. 3. Thus IED A can calculate the overall communication delay through the following equations (13) and (14):

$$T_{p1p2}=T_{p1}+T_{p2}=(T_5-T_1)-(T_4-T_2) \quad (13)$$

$$T_{p1p2}=T_{p1}+T_{s2}=(T_6-T_1)-(T_3-T_2) \quad (14)$$

As explained above, both T6, T1, T5 are obtained from IED A, and both T3, T2, T4 are obtained from IED B. Therefore, the values of $T_{p1s2}$ and $T_{p1p2}$ are reliable.

Step 2: IED A send out message to IED B via secondary channel, then IED B send echo information back to IED A via secondary channel and primary channel. The corresponding communication delays can be calculated through equations (15) and (16) similarly.

$$T_{s1s2}=T_{s1}+T_{s2} \quad (15)$$

$$T_{s1p2}=T_{s1}+T_{p2} \quad (16)$$

Step 3: IED compare $T_{p1s2}$ with $T_{s1p2}$. If the difference between $T_{p1s2}$ and $T_{s1p2}$ (or preferably their mean values) is bigger than given threshold $T_{ps*thre}$, then it determines that at least one of the channels has asymmetrical delays. If this asymmetry is detected at the beginning period when the IED is put into service, the IED should issue an alarm to indicate the channel delay asymmetry. If this asymmetry is detected during normal operation period, it indicates a channel switching, and the procedure goes to the next step.

The threshold $T_{ps*thre}$ can be set by IED operators, based on the sum of the max possible difference between the communication delays of sending and receiving paths for two symmetrical channels, which is according to the jitter characteristic of the communication channel. For example, according to the communication delays given in Table. 1, the max possible differences between the communication delays for primary channel and secondary channel are 0.11 ms and 0.18 ms. Considering a reasonable margin, the threshold $T_{ps*thre}$ can be set by IED operator as 0.4 ms. If the mean values are used in the comparison, then the threshold $T_{ps*thre}$ can be set based on the sum of the max possible difference between the mean values of communication delays of sending and receiving paths for two symmetrical channels, which is according to the jitter characteristic of the communication system. For example, according to the communication delays given in Table. 1, the max possible differences between the mean values of communication delays for primary channel and secondary channel are 0.01 ms and 0.05 ms. Considering a reasonable margin, the threshold $T_{ps*thre}$ can be set by IED operator as 0.1 ms.

Step 4: IED compares the $T_{p1p2}$, $T_{s1s2}$ with their previous values. If both $T_{p1p2}$ and $T_{s1s2}$ (or preferably their mean values) change from their previous values (or preferably mean values) more than given thresholds $T_{p*thre}$ and $T_{s*thre}$ respectively, then the IED issues an alarm to indicate that both channels are switched. If only one of the communication delays (either $T_{p1p2}$ or $T_{s1s2}$) changes more than its corresponding threshold, the IED issues an alarm to indicate that the primary or secondary channel corresponding to the changed delay is switched. Under this condition, the new communication delays of the switched channel can be calculated with above equations (13), (14), (15) and (16), as the communication delays of the un-switched channel are know from the echo calculation before the channel switching. Then the IEDs can detect the channel delay asymmetry of the switched channel by calculating the difference between the communication delays ($T_{diff}$) and comparing $T_{diff}$ with $T_{diff*thre}$, as introduced in Embodiment one. And the IEDs can perform echo calculation utilizing $T_{diff}$ as introduced in Embodiment one, and the calculation results can be used to perform the synchronization.

The thresholds $T_{p*thre}$ and $T_{s*thre}$ can be set by IED operator based on the sum of the max possible jitter in the communication delays of sending and receiving paths when the paths are not switched according to the jitter characteristic of the communication channel. From the viewpoint of simplicity, these two thresholds can be set as the same value. For example, according to the communication delays given in Table. 1, the sum of the max possible jitter in the communication delays for primary and secondary channels are 0.2 ms and 0.25 respectively. Considering a reasonable margin, the thresholds $T_{p*thre}$ and $T_{s*thre}$ can be both set as 0.4 ms. If the mean values are used in the comparison, as the max possible jitter in the mean values of communication delays when the path is not switched is theoretically around 0, the thresholds $T_{p*thre}$ and $T_{s*thre}$ can be set considering only a reasonable margin, for example, 0.1 ms.

Configuration 2: The Protected Line (or Parallel Lines) has Two Sets of Differential Protection Devices with Respective Communication Channels.

Figure 4:
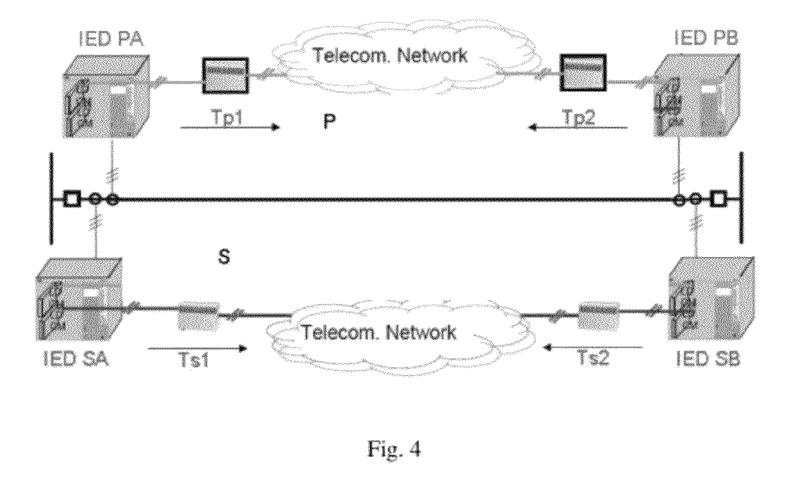
FIG. 4 shows a schematic view of line protection system with four IEDs.

As shown in FIG. 4, there are four IEDs, i.e., IED PA, IED PB for primary protection and IED SA, IED SB for secondary protection. The primary and secondary protections normally use separate communication channels, i.e. primary channel for primary protection, and secondary channel for secondary protection.

The sending/receiving delays of primary channel (P) and secondary channel (S) are $T_{p1}$, $T_{p2}$, $T_{s1}$ and $T_{s2}$ respectively. As shown in the figure, for IED PA, $T_{p1}$ is sending delay via primary channel; $T_{p2}$ is receiving delay via primary channel; for IED SA, $T_{s1}$ is sending delay via secondary channel; and $T_{s2}$ is receiving delay via primary channel. $T_{p1p2}$ is the delay of sending and receiving message on primary channel only. $T_{s1s2}$ is the delay of sending and receiving message on secondary channel only. Similarly, $T_{p1s2}$ and $T_{s1p2}$ are the delays of sending and receiving message via both primary and secondary channels. In an ideal operation condition, both channels have symmetrical delays, i.e. $T_{p1}$ equals to $T_{p2}$ and $T_{s1}$ equals to $T_{s2}$. The following proposed solution can detect the condition when channel delays become asymmetrical, as described below:

Step 1: IED PA sends a message to IED PB via primary channel. Then IED PB sends echo information back to IED PA via primary channel and secondary channel. Thus, IED PA calculates two communication delays: $T_{p1p2}$ and $T_{p1s2}$.

So that IED PB can send echo information back to IED PA via secondary channel, it need to firstly send the echo information to IED SB, then IED SB send the information via secondary channel to IED SA, and at last IED SA send the information to IED PA. It should be noted that the communication delays introduced by the communication between IED PB and IED SB (and between IED SA and IED PA) must be calculated and subtracted from the total measured communication delay to get $T_{p1s2}$. The communication between IED PB and IED SB (or IED PA and IED SA) can be via GOOSE or other peer-to-peer communication, and the communication delay can be calculated through each or both of the following methods:

1) By measuring the voltage phase difference (as both IED measure the voltage of same point). For example, if IED PB sends GOOSE message to IED SB at the 0° of phase A voltage, and IED SB receives the message at 18° of phase A voltage, then the delay is 1 ms (for 50 Hz system).

2) Or as both IEDs locate in the same substation, they can easily be synchronized by external clock (e.g. GPS) or other ways. Once both IEDs are synchronized, then it's easy for them to calculate the communication delay.

Step 2: Similar to Step 1, IED SA can calculate communication delays $T_{s1s2}$ and $T_{s1p2}$. Then IED SA sends the calculated $T_{s1s2}$ and $T_{s1p2}$ to IED PA (or vise versa).

Step 3: IED PA compares $T_{p1s2}$ with $T_{s1p2}$. If the difference between $T_{p1s2}$ and $T_{s1p2}$ is bigger than a given threshold value $T_{ps*thre}$, then it can be inferred that at least one of the channels has asymmetrical delays. If this condition is detected at the beginning period when the IED is put into service, the IED issues an alarm to indicate the channel delay asymmetry. If this condition is detected during the normal operation period, it indicates a channel switching, and the procedure goes to the next step.

Step 4: IED compares the $T_{p1p2}$, $T_{s1s2}$ with their previous values. If both $T_{p1p2}$ and $T_{s1s2}$ change from their previous values (or mean values) more than given thresholds $T_{p*thre}$ and $T_{s*thre}$ respectively, then the IED issues an alarm to indicate that both channels are switched. If only one of the communication delays (either $T_{p1p2}$ or $T_{s1s2}$) changes more than its corresponding threshold, the IED issues an alarm to indicate that the primary or secondary channel corresponding to the changed delay is switched. Under this condition, the new communication delays of the switched channel can be calculated with above equations (13), (14), (15) and (16), as the communication delays of the un-switched channel are know from the echo calculation before the channel switching. Then the IEDs can detect the channel delay asymmetry of the switched channel by calculating the difference between the communication delays ($T_{diff}$) and comparing $T_{diff}$ with $T_{diff*thre}$, as introduced in Embodiment one. And the IEDs can perform echo calculation utilizing $T_{diff}$ as introduced in Embodiment one, and the calculation results can be used to perform the synchronization.

It should be noted that the channel delay asymmetry for line differential protection is an abnormal condition and happens seldom. Therefore, it is highly impossible that both primary and secondary channels are switched at the same time, or have the same level of asymmetry. So the judgment in step 3 and 4 is very reliable.

The proposed method is mainly for detecting the channel delay asymmetry during the operation of IEDs and synchronizing the IEDs. During the start up period of IEDs, normally the utility field engineers will be required to ensure the channel delay symmetry, thus the risk of channel delay asymmetry is small. It also has to be noted that the methods in Embodiment two can be used to detect the channel delay asymmetry during the start up period of IEDs. It also has to be noted that although only two communication channels, primary channel and secondary channel, were described above, the method is also applicable to a system with more channels. For example, any two channels from a plurality of channels may be selected and regarded as the primary channel and secondary channel. And the asymmetry detecting and synchronizing method can be applied to the selected channels and other channels in sequence.

The embodiments described above can be implemented in a combined approach. For example, the detecting method in second embodiment can be used to detecting channel delay asymmetry and the method in first embodiment can be used to synchronize the IEDs.

All methods described above can be implemented by a hardware controller with corresponding units. For example, a controller for synchronizing communication channels between transmission line protection devices may comprise the following units. A calculating unit repeatedly calculates a clock disparity between clocks of the protection devices and communication delays at different paths of the communication channel. A comparing unit compares the latest calculated clock disparity and communication delays with previously calculated clock disparities and communication delays, respectively. A first determining unit determines a channel switching has happened if a change of the calculated clock disparity exceeds a first threshold, or a change of the calculated communication delays for any path exceeds a second threshold. A second determining unit, which is configured to determine the channel delays as asymmetrical if a difference between the calculated communication delays of the different paths after the channel switching exceeds a third threshold.

Similarly, a controller for detecting communication channel delay asymmetry between transmission line protection devices may comprise the following units. A sending and receiving unit sends and receives data through a first channel and a second channel. A first calculating unit calculates a first delay for sending and receiving data through the first channel and second channel sequentially. A second calculating unit calculates a second delay for sending and receiving data through the second channel and first channel sequentially. A determining unit determines the communication channels as asymmetrical if the difference between the first delay and second delay exceeds a fifth threshold.

The methods and apparatus of present invention may be implemented as a piece of software run on a digital computer, or as a hard-wired implementation using techniques such as EPROM etc. In the case of implementing the proposed method as hardware, it is clear to those skilled in the art that each step for identifying asymmetry may correspond to a separate hardware component.

Alternatively, all the steps or functions may be implemented by an integrated processor. In which, all above separate units and component are combined together to perform the proposed method. All available semiconductor techniques may be used to produce such hardware.

For those skilled in the art, various modifications can be conceived without departing from the scope of present invention. The invention intends to include all possible modifications within the proposed concept, and the scope of the invention should be defined by the accompanied claims instead of above detailed embodiments.

The invention claimed is:

1. A method for detecting communication channel delay asymmetry between transmission line protection devices, the method, comprising:
    calculating, repeatedly, a clock disparity between clocks of the protection devices and communication delays at different paths of a communication channel;
    comparing a latest calculated clock disparity and communication delays with previously calculated clock disparities and communication delays, respectively;
    determining a channel switching has happened if a change of the calculated clock disparity exceeds a first threshold, or a change of the calculated communication delays for any path exceeds a second threshold; and
    determining the channel delays as asymmetrical if a difference between the calculated communication delays of the different paths after the channel switching exceeds a third threshold.

2. The method according to claim 1, wherein,
    the clock disparity and communication delays are calculated based on a difference between the communication delays of data sending and receiving paths; and the method further comprises:
    synchronizing signals sampled by protection devices based on the calculated clock disparities and communication delays.

3. The method according to claim 2, the step of determining the channel delays as asymmetrical comprises:
    calculating the communication delays of sending and receiving path after the channel switching, based on the clock disparities calculated before the channel is switched; and
    calculating the difference between the communication delays of sending and receiving path after the channel switching.

4. The method according to claim 1, the step of determining the channel delays as asymmetrical comprises:
    calculating the communication delays of sending and receiving path after the channel switching, based on the clock disparities calculated before the channel is switched; and
    calculating the difference between the communication delays of sending and receiving path after the channel switching.

5. The method according to claim 4, the step of calculating the communication delays after the channel switching further comprises:
    comparing the calculated communication delays after the channel switching with the calculated communication delays before the channel switching;
    identifying a communication path which is un-switched if the change of the calculated communication delays of the path is less than a fourth threshold;
    adjusting the clock disparities by the communication delay of the un-switched communication channel, and
    adjusting the communication delays of the data sending and receiving path by the adjusted clock disparities.

6. The method according to claim 5, the step of comparing the calculated communication delays comprises:
    calculating a mean value of the calculated communication delays before the channel switching;
    calculating a mean value of the calculated communication delays after the channel switching;
    comparing the calculated mean value after the channel switching with the calculated mean value before the channel switching.

7. The method according to claim 4, the step of calculating the difference between the communication delays of sending and receiving paths comprises:
    calculating a mean value of the calculated communication delays of sending path and a mean value of calculated communication delays of receiving path; and
    calculating the difference between the mean values of the communication delays of sending path and receiving path.

8. The method according to claim 1, the step of comparing clock disparities and communication delays further comprises:
    calculating a mean value of the calculated clock disparities, a mean value of the calculated communication delays of data sending path, and a mean value of the calculated communication delays of data receiving path;
    comparing the latest calculated clock disparity with the mean value of calculated clock disparities; and
    comparing the latest calculated communication delays with the mean values of calculated communication delays.

9. The method according to claim 1, wherein:
    the first and fourth thresholds depend on an accuracy of oscillators of the protection devices, a length of communication interruption period caused by the channel switching, and a jitter characteristic of communication channels; and
    the second and third thresholds depend on the jitter characteristic of the communication channel.

10. A method for detecting communication channel delay asymmetry between transmission line protection devices, wherein the communication channel comprises a first channel and a second channel, the first channel comprises a first path and a second path, and the second channel comprises a third path and a fourth path, the method, comprising:
    sending data through the first path of the first channel and receiving the data through the third path of the second channel;
    calculating a first delay for sending and receiving the data through the first path of the first channel and the third path of the second channel sequentially;
    sending data through the fourth path of the second channel and receiving the data through the second path of the first channel;
    calculating a second delay for sending and receiving data through the fourth path of the second channel and the second path of the first channel sequentially;

determining the communication channels as asymmetrical if the difference between the first delay and the second delay exceeds a first threshold;

calculating, at least twice, a third delay for sending and receiving data through the first channel;

calculating, at least twice, a fourth delay for sending and receiving data through the second channel;

obtaining a difference between the at least two third delays and a difference between the at least two fourth delays;

determining the first channel as switched channel if the difference between third delays is more than a second threshold, and determining the second channel as switched channel if the difference between fourth delays is more than the second threshold; and calculating the communication delays of sending and receiving paths of the switched channel.

11. The detecting method according to claim 10, wherein: the first and second thresholds depend on a jitter characteristic of the communication channels.

12. An apparatus for detecting communication channel delay asymmetry between transmission line protection devices, the apparatus, comprising:

a calculating unit, which is configured to repeatedly calculate a clock disparity between clocks of the protection devices and communication delays at different paths of the communication channel, a comparing unit, which is configured to compare a latest calculated clock disparity and communication delays with previously calculated clock disparities and communication delays, respectively;

a first determining unit, which is configured to determine a channel switching has happened if a change of the calculated clock disparity exceeds a first threshold, or a change of the calculated communication delays for any path exceeds a second threshold; and a second determining unit, which is configured to determine the channel delays as asymmetrical if a difference between the calculated communication delays of the different paths after the channel switching exceeds a third threshold.

* * * * *